US011469479B2

(12) United States Patent
Masson et al.

(10) Patent No.: US 11,469,479 B2
(45) Date of Patent: Oct. 11, 2022

(54) BUSBAR FOR A BATTERY PACK, INTENDED TO ELECTRICALLY CONNECT AT LEAST ONE ACCUMULATOR BATTERY OF THE PACK AND TO ALLOW A HEAT TRANSFER FLUID TO FLOW THEREIN IN ORDER TO OPTIMALLY COOL THE ACCUMULATOR BATTERY AND THE PACK, IN PARTICULAR IN THE CASE OF THERMAL RUNAWAY

(71) Applicant: COMMISSARIAT A L'ENERGIE ATOMIQUE ET AUX ENERGIES ALTERNATIVES, Paris (FR)

(72) Inventors: Olivier Masson, Grenoble (FR); Pierre Coste, Grenoble (FR); Magali Reytier, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 145 days.

(21) Appl. No.: 16/913,117

(22) Filed: Jun. 26, 2020

(65) Prior Publication Data
US 2021/0013480 A1   Jan. 14, 2021

(30) Foreign Application Priority Data

Jul. 8, 2019 (FR) ..................... 19 07619

(51) Int. Cl.
| H01M 50/529 | (2021.01) |
| H01M 10/6568 | (2014.01) |
| H01M 10/6569 | (2014.01) |
| H01M 50/543 | (2021.01) |
| H01M 4/38 | (2006.01) |
| H01M 4/505 | (2010.01) |
| H01M 4/525 | (2010.01) |

(Continued)

(52) U.S. Cl.
CPC ......... *H01M 50/529* (2021.01); *H01M 4/382* (2013.01); *H01M 4/505* (2013.01);
(Continued)

(58) Field of Classification Search
CPC ............. H01M 50/529; H01M 50/543; H01M 10/6568; H01M 10/6569; H01M 10/0525;
(Continued)

(56) References Cited

U.S. PATENT DOCUMENTS

| 5,320,190 A | 6/1994 | Naumann et al. |
| 7,335,448 B2 | 2/2008 | Kaito et al. |

(Continued)

FOREIGN PATENT DOCUMENTS

| CN | 202259596 U | 5/2012 |
| DE | 10 2011 118 686 A1 | 5/2013 |

(Continued)

OTHER PUBLICATIONS

France Search Report dated Apr. 9, 2020 in France Patent Application No. 1907619, 2 pages.

(Continued)

*Primary Examiner* — Karie O'Neill Apicella
(74) *Attorney, Agent, or Firm* — Oblon, McClelland, Maier & Neustadt, L.L.P.

(57) ABSTRACT

A busbar for a battery pack, intended to electrically connect at least one electrochemical accumulator battery of the pack, preferably to electrically connect several electrochemical accumulator batteries of the pack to one another, including an electrically conductive and sealtight envelope itself intended to channel the current of the accumulator batteries and designed to contain a heat transfer liquid whose vaporization temperature is chosen so as to be between a value close to 90% of the self-heating temperature and a value close to 110% of the thermal runaway temperature of the accumulator batteries of the pack, the sealtight envelope being designed to guarantee an injection of heat transfer liquid as close as possible to each accumulator battery to (Continued)

which it is intended to be connected, preferably close to at least one of its output terminals.

18 Claims, 7 Drawing Sheets

(51) Int. Cl.
    *H01M 4/583* (2010.01)
    *H01M 10/0525* (2010.01)
    *H01M 4/02* (2006.01)

(52) U.S. Cl.
    CPC ........... *H01M 4/525* (2013.01); *H01M 4/583* (2013.01); *H01M 10/0525* (2013.01); *H01M 10/6568* (2015.04); *H01M 10/6569* (2015.04); *H01M 50/543* (2021.01); *H01M 2004/027* (2013.01); *H01M 2004/028* (2013.01)

(58) Field of Classification Search
    CPC ...... H01M 4/382; H01M 4/505; H01M 4/525; H01M 4/583
    See application file for complete search history.

(56) References Cited

U.S. PATENT DOCUMENTS

| | | |
|---|---|---|
| 7,338,733 B2 | 3/2008 | Morita et al. |
| 7,348,098 B2 | 3/2008 | Hayashi et al. |
| 8,609,268 B2 | 12/2013 | Fuhr et al. |
| 8,877,366 B2 | 11/2014 | Weber et al. |
| 2006/0121348 A1 | 6/2006 | Mizutani et al. |
| 2008/0057392 A1 | 3/2008 | Takamatsu et al. |
| 2008/0060189 A1 | 3/2008 | Daidoji et al. |
| 2012/0129030 A1 | 5/2012 | Lim |
| 2013/0183566 A1* | 7/2013 | Wayne ................ H01M 50/213 429/120 |
| 2013/0196184 A1 | 8/2013 | Faass et al. |
| 2018/0069278 A1* | 3/2018 | Mastrandrea ....... H01M 10/613 |
| 2020/0127351 A1* | 4/2020 | Smith ............... H01M 10/6568 |

FOREIGN PATENT DOCUMENTS

| | | |
|---|---|---|
| DE | 10 2013 017 396 A1 | 4/2015 |
| EP | 3 293 786 A1 | 3/2018 |
| EP | 3 293 794 A1 | 3/2018 |
| FR | 3 004 292 A1 | 10/2014 |
| FR | 3 010 834 A1 | 3/2015 |
| WO | WO 2008/156737 A1 | 12/2008 |
| WO | WO 2011/013997 A2 | 2/2011 |
| WO | WO 2012/165781 A2 | 12/2012 |

OTHER PUBLICATIONS

Feng, X., et al., "Key Characteristics for Thermal Runaway of Li-ion Batteries", Science Direct, Energy Procedia, Aug. 2018, pp. 1-5 with cover page.

* cited by examiner

Fig.3

(PRIOR ART)

(PRIOR ART)

BUSBAR FOR A BATTERY PACK, INTENDED TO ELECTRICALLY CONNECT AT LEAST ONE ACCUMULATOR BATTERY OF THE PACK AND TO ALLOW A HEAT TRANSFER FLUID TO FLOW THEREIN IN ORDER TO OPTIMALLY COOL THE ACCUMULATOR BATTERY AND THE PACK, IN PARTICULAR IN THE CASE OF THERMAL RUNAWAY

TECHNICAL FIELD

The present invention relates to the field of electrochemical accumulator batteries, and more particularly to metal-ion accumulator batteries.

The invention relates more particularly to a busbar for a battery pack.

It is recalled here that a busbar is a strip or bar made of electrically conductive material, possibly laminated with one or more electrically insulating materials, and that is fastened, preferably screwed or welded, to an output terminal of at least one electrochemical accumulator battery in order to create the electrical connection to another electrochemical accumulator battery of a battery pack or another electrical input/output element.

The invention aims primarily to optimize the cooling of the accumulator batteries of a battery pack, such that the energy of a thermal runaway of a given accumulator battery within the pack is not able to propagate to the other accumulator batteries.

Although it is described with reference to a lithium-ion accumulator battery, the invention applies to any metal-ion electrochemical accumulator battery, that is to say also to sodium-ion, magnesium-ion, aluminum-ion, etc. accumulator batteries, or more generally to any electrochemical accumulator battery.

A battery pack according to the invention may be embedded or stationary. For example, the fields of electric and hybrid transportation and networked storage systems may be contemplated in the context of the invention.

PRIOR ART

Figure 1:
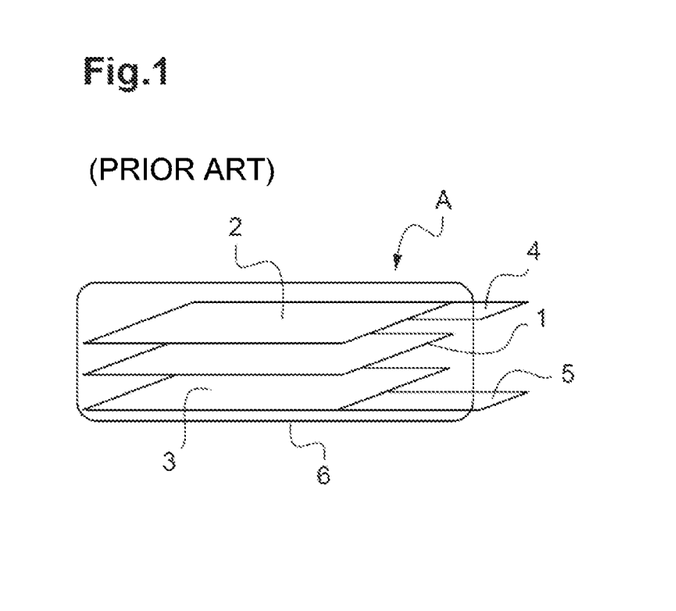
FIG. 1 is a schematic perspective exploded view showing the various elements of a lithium-ion accumulator battery.
Figure 2:
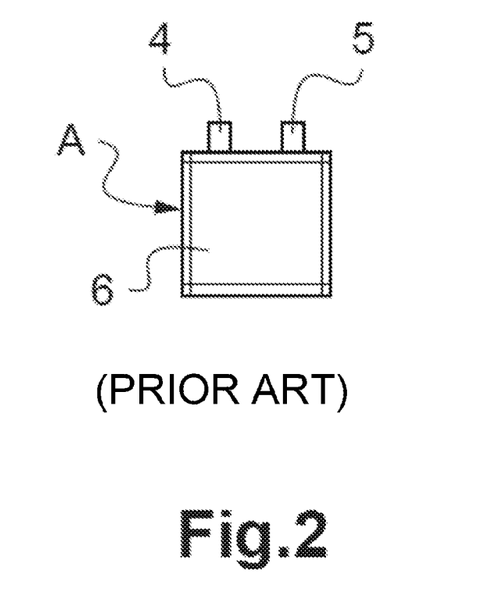
FIG. 2 is a front view showing a lithium-ion accumulator battery with its flexible packaging according to the prior art.

As illustrated schematically in FIGS. 1 and 2, a lithium-ion battery or accumulator battery usually comprises at least one electrochemical cell consisting of an electrolyte component 1 between a positive electrode or cathode 2 and a negative electrode or anode 3, a current collector 4 connected to the cathode 2, a current collector 5 connected to the anode 3 and lastly a packaging 6 designed to contain the electrochemical cell in a sealtight manner while at the same time being passed through by a portion of the current collectors 4, 5.

The architecture of conventional lithium-ion batteries comprises an anode, a cathode and an electrolyte. Several types of conventional architecture geometry are known:
 a cylindrical geometry, as disclosed in patent application US 2006/0121348,
 a prismatic geometry, as disclosed in U.S. Pat. Nos. 7,348,098, 7,338,733;
 a stacked geometry, as disclosed in patent applications US 2008/060189, US 2008/0057392, and patent U.S. Pat. No. 7,335,448.

The electrolyte component 1 may be in solid, liquid or gel form. In the last form, the component may comprise a separator made of polymer, ceramic or microporous composite material impregnated with ionic liquid organic electrolyte(s), making it possible to displace the lithium ion from the cathode to the anode for charging and vice versa for discharging, thereby generating the current. The electrolyte is generally a mixture of organic solvents, for example carbonates, to which a lithium salt, typically LiPF6, is added.

The positive electrode or cathode 2 consists of insertion materials for the lithium cation, which are generally composite, such as $LiFePO_4$, $LiCoO_2$, $LiNi_{0.33}Mn_{0.33}Co_{0.33}O_2$. The negative electrode or anode 3 very often consists of carbon graphite or of $Li_4TiO_5O_{12}$ (titanate material), possibly also based on silicon or a silicon-based composite.

The current collector 4 connected to the positive electrode is generally made of aluminum. The current collector 5 connected to the negative electrode is generally made of copper, nickel-plated copper or aluminum.

A lithium-ion battery or accumulator battery may of course comprise a plurality of electrochemical cells that are stacked on top of one another.

Traditionally, a Li-ion battery or accumulator battery uses a pair of materials at the anode and at the cathode allowing it to operate at a high voltage level, typically equal to 3.6 volts. Depending on the desired type of application, it is sought to create either a thin and flexible lithium-ion accumulator battery or a rigid accumulator battery: the packaging is then either flexible or rigid and, in the latter case, forms a sort of housing.

Flexible packagings are usually made from a multilayer composite material consisting of a stack of aluminum layers covered by one or more adhesively laminated polymer film(s). Rigid packagings for their part are used when the targeted applications are constrictive or a long service life is sought, with for example far higher pressures to be withstood and a stricter required level of sealtightness, typically less than $10^{-8}$ mbar.1/s, or in sectors with heavy constraints, such as the aeronautical or space field.

Therefore, a rigid packaging that is used at present consists of a metal housing, typically made of stainless steel (316L stainless steel or 304 stainless steel) or of aluminum (Al 1050 or Al 3003), or else titanium.

The geometry of the majority of rigid housings for Li-ion accumulator battery packagings is cylindrical, since the majority of electrochemical cells of accumulator batteries are wound in a cylindrical geometry around a cylindrical mandrel in a winding process.

Prismatic housing shapes have also already been produced by a winding process around a prismatic mandrel.

Patent application FR3004292 describes the use of the inside of the mandrel as an air gap in order to cool the core of a wound cell of a metal-ion accumulator battery.

Figure 3:
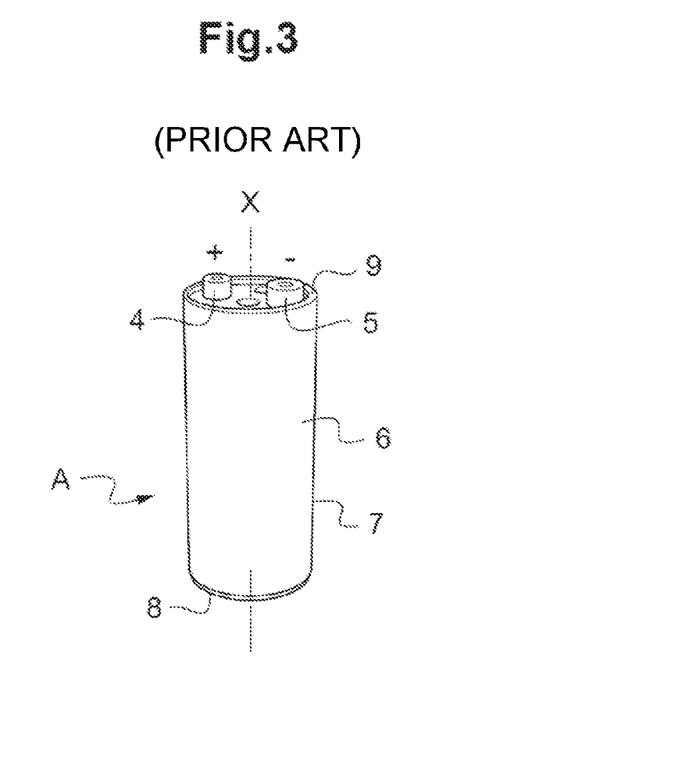
FIG. 3 is a perspective view of a lithium-ion accumulator battery according to the prior art with its rigid packaging consisting of a cylindrical housing.

One of the types of cylindrical rigid housing, usually produced for a high-capacity Li-ion accumulator battery, is illustrated in FIG. 3.

Figure 4:
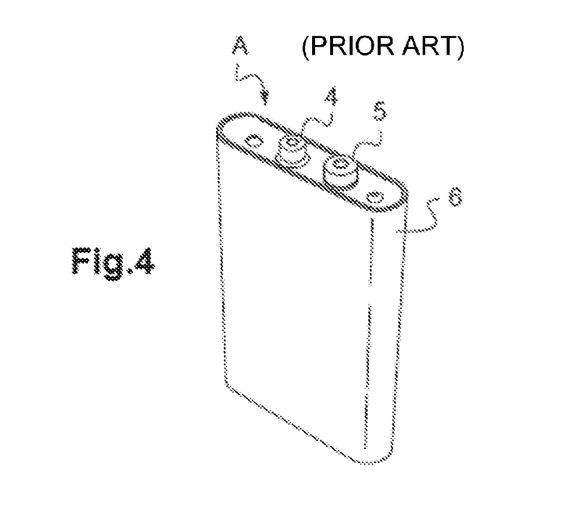
FIG. 4 is a perspective view of a lithium-ion accumulator battery according to the prior art with its rigid packaging consisting of a prismatic housing.

A prismatic rigid housing is also shown in FIG. 4.

The housing 6 comprises a cylindrical lateral envelope 7, a base 8 at one end, a cover 9 at the other end, the base 8 and the cover 9 being attached to the envelope 7. The cover 9 supports the poles or output terminals for the current 4, 5. One of the output terminals (poles), for example the negative terminal 5, is welded to the cover 9, whereas the other output terminal, for example the positive terminal 4, passes through the cover 9 with the interposition of a seal, not shown, that electrically isolates the positive terminal 4 from the cover.

The type of widely produced rigid housing generally consists of a drawn bucket and a cover that are welded to one another at their periphery. By contrast, the current collectors comprise a passage with a part projecting above the housing and that forms a terminal, also called exposed pole of the battery.

A battery pack P consists of a variable number of accumulator batteries, which may reach several thousand, that are connected electrically in series or in parallel with one another and generally by connection bars, commonly called busbars.

Figure 5:
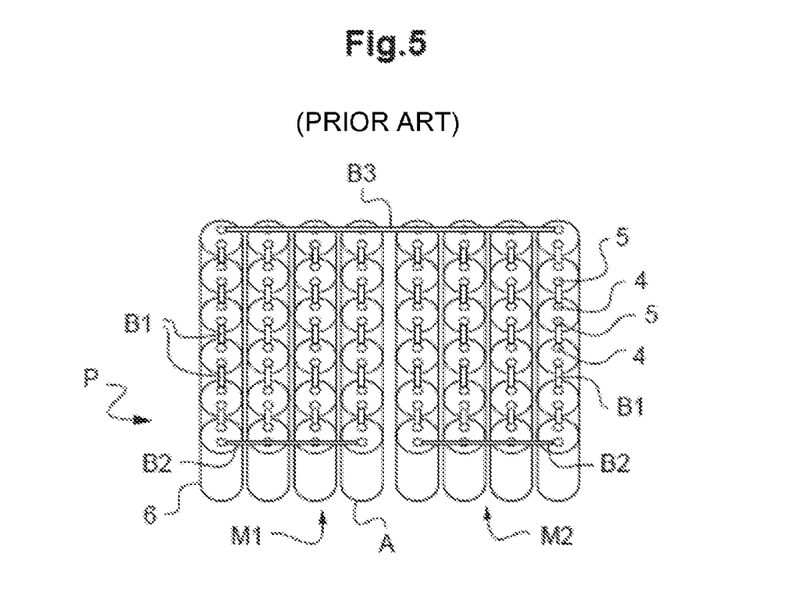
FIG. 5 is a perspective view of an assembly, by way of busbars, of lithium-ion accumulator batteries according to the prior art, forming a battery pack.

One example of a battery pack P is shown in FIG. 5. This pack consists of two modules M1, M2 of Li-ion accumulator batteries A that are identical and connected to one another in series, each module M1, M2 consisting of four rows of accumulator batteries connected in parallel, each row consisting of a number equal to six Li-ion accumulator batteries.

As shown, two Li-ion accumulator batteries on one and the same row are connected mechanically and electrically through the screwing of busbars B1, advantageously made of copper, each connecting a positive terminal 4 to a negative terminal 5. Two rows of accumulator batteries are connected in parallel within one and the same module M1 or M2 by a busbar B2, also advantageously made of copper. The two modules M1, M2 are connected by a busbar B3, also advantageously made of copper.

In the development and the production of lithium-ion batteries, for each profile/new request, regardless of the players on the market, this requires precise dimensioning (series/parallel electrical, mechanical, thermal, etc. architectures) in order to optimally design a high-performance and safe battery pack.

In particular, it is necessary to take into consideration the safety of lithium-ion accumulator batteries simultaneously at the level of a single accumulator battery, of a module and of a battery pack.

Various passive or active devices having a safety function may also be integrated into a cell (accumulator battery) and/or a module and/or the battery pack in order to prevent problems, when the battery is in what are called improper operating conditions.

A lithium electrochemical system, regardless of the level of the cell (accumulator battery), the module or the pack, produces exothermic reactions regardless of the given cycling profile. Thus, on the level of a single accumulator battery, depending on the chemistries under consideration, optimum operation of lithium-ion accumulator batteries is limited to within a certain temperature range.

An electrochemical accumulator battery has to operate in a defined temperature range, typically generally less than 70° C. on its outer housing surface, otherwise its performance degrades, or it is even physically degraded as far as being destroyed.

Mention may be made for example of iron-phosphate chemistry lithium accumulator batteries, which have an operating range generally between −20° C. and +60° C. Beyond 60° C., the materials may undergo significant degradations, reducing the performance of the cell. Beyond what is called a thermal runaway temperature, which may be between 70° C. and 110° C., exothermic internal chemical reactions are triggered. When the accumulator battery is no longer capable of evacuating enough heat, the temperature of the cell increases until it is destroyed, this phenomenon usually being called thermal runaway.

In other words, thermal runaway occurs in a cell (accumulator battery) when the energy released by exothermic reactions occurring inside said cell exceeds the capacity to dissipate it to the outside. This runaway may be followed by a generation of gas and an explosion and/or fire.

In addition, maintaining a temperature of below 70° C. makes it possible to increase the service life of an accumulator battery, since the higher the operating temperature of an accumulator battery, the shorter its service life will be.

Furthermore, some accumulator battery chemistries require an operating temperature well beyond ambient temperature, and it therefore proves necessary to regulate their temperature level by initially preheating the accumulator batteries, or even to keep the accumulator batteries at a constant temperature.

In a cell (accumulator battery), the various known internal protection devices are as follows:
- a polymeric positive temperature coefficient (PTC) device: at present, a large number of cylindrical accumulator batteries already on the market are equipped therewith. Such a device takes the form of a ring made of polymer (polyethylene) laminated with a metal. In the event of overloading, this polymer heats up, changes phase, becomes more resistive and thus limits the flow of current;
- a current interruption device (CID): this interrupts the current if the pressure of the gas in the cell exceeds specified limits;
- a circuit breaker (shutdown) device that prevents high currents from being generated;
- a blowhole consisting of a valve and a burst disk, which opens when the pressure increases sharply and exceeds a determined critical pressure in order to avoid the cell exploding;
- a thermal fuse, implemented at present in high-capacity accumulator batteries, which cuts the current as soon as the temperature in the battery is too high.

In a battery, or battery pack containing a plurality of Li-ion accumulator batteries, placing more or less different accumulator batteries in series or parallel may have consequences on the resulting performance of the pack.

It is thus recognized that, in a battery pack, for example of an electric vehicle, aging dispersions may be high depending for example on the position of the accumulator batteries, following aging asymmetries between the accumulator batteries or different uses (thermal variations between the center and the edges of the pack, current gradient, etc.).

Therefore, in order to limit premature aging of the pack, it is necessary to optimize the operating temperature and the temperature dispersion from one accumulator battery to another. An accumulator battery (or accumulator batteries) that age(s) faster than the others may have a direct impact on the electrical performance of the whole battery pack. This is manifested in a decrease in the total usable capacity of the battery pack.

At the level of the module and of the pack, typically below 0° C. for example, it may be necessary to use a BMS in order to limit the power requested from the pack in order to avoid degrading the accumulator batteries, in particular in order to charge the battery.

It is recalled here that the BMS (acronym for battery management system) is used in order to protect the elements from factors that increase their hazardousness, such as excessively high currents, unsuitable potentials (too high or too low) and limit temperatures. The BMS therefore stops current applications (charging, discharging) as soon as threshold voltages are reached.

Beyond an upper temperature, typically of the order of 70° C., it is also necessary to be vigilant, since electrochemical reactions may lead to the destruction of the single accumulator batteries and bring about propagation of a fault internal to the accumulator battery, generally an internal short circuit, which may lead at worst to the pack exploding.

In this case, it is also necessary to use the BMS in order to protect the accumulator batteries.

The difficulty arises in ensuring uniformity of the temperature within a battery pack. Therefore, these thermal considerations generally impose that the temperature of the accumulator batteries of a battery pack has to be regulated.

Various heat management strategies are proposed in order to optimize integrated cooling systems and to allow the battery pack to operate at a target ambient temperature and to ensure homogeneity of the temperature of the cells. The heat management system should therefore be capable of responding very precisely if a temperature gradient is observed in the cells forming it.

In the literature, the solutions disclosed as an attempt to ensure temperature homogeneity within a battery pack may essentially be classed into three categories.

The first category relates to the use of cold plates.

Patent U.S. Pat. No. 8,609,268 thus discloses a cold plate system within which a refrigerant fluid flows, in order to drain heat from accumulator batteries in contact with the cold plate.

Patent application WO2011/013997 proposes cooling fins arranged inside a stack of flat cells for draining heat from the cells to a fluid flowing at the bottom of the stack.

The second category relates to cooling through a phase-changing material.

In patent application DE102013017396A1, the boiling heat transfer liquid is in direct contact with the cells in the module of the battery, in order to control the temperature and to keep it within a predetermined temperature range.

The third category relates to solutions where a (gaseous or liquid) heat transfer fluid is channeled within a battery pack.

Patent U.S. Pat. No. 5,320,190 thus proposes an air flow for cooling a vehicle battery pack, either directly using the air impacting the vehicle while driving, or using a blower for stationary phases or just after starting driving.

Patent CN202259596U proposes a battery pack that incorporates air distributors.

Patent application WO2012/165781 proposes a system of air guidance plates that makes it possible a priori to reduce the temperature difference between modules of batteries.

A cooling liquid may be used instead of air. Specifically, the concepts of cost, bulk and additional mass may be decisive factors depending on the application under consideration. For example, air cooling is the least burdensome solution since, as indicated, it consists of the forced blowing of air between the accumulator batteries. On the other hand, the thermal performance of air cooling is of poor quality due to the low exchange coefficient and the low thermal inertia. Thus, in this type of cooling, in spite of everything, the first accumulator battery will heat up in contact with air and the air temperature will increase. When passed to the second accumulator battery, the air is hotter and the accumulator battery is hotter than the first one. Ultimately, it is therefore possible to obtain accumulator batteries whose temperature is inhomogeneous or whose cooling is not enough to limit the risk of runaway.

Liquid cooling-based solutions are therefore far more effective in terms of heat exchanges: they consist in performing direct cooling through thermal conduction using a preferably dielectric liquid.

For example, patent application WO2008/156737 and patent US2013196184 propose a system with channels that each run along part of the periphery of several cylindrical accumulator batteries that are parallel with one another. A heat transfer liquid runs inside these channels in order to drain heat.

Patent U.S. Pat. No. 8,877,366 relates to a cooling solution using liquid running through external tubes that cool fins, inserted between accumulator batteries, through thermal conduction.

Patent FR3010834 discloses a device for thermally regulating a battery pack, comprising a heat exchanger with tubes in contact with the accumulator batteries at the base of the casing (envelope) of the battery pack.

Mersen has proposed a battery pack with busbars to which pipes with several bends are connected and welded, preferably glycolated water flowing inside these pipes during operation of the battery pack for cooling purposes. Reference may be made to: https://www.mersen.com/sites/default/files/publications-media/16-markets-transportation-ev-hev-emobility-presentation-mersen.pdf. As explained in this publication, the pipes are intended to eliminate hotspots in the pack during operation.

Reference may also be made to patent application EP3293786, which describes a similar cooling plate system.

As explained above, a cell or an accumulator battery of the battery pack may experience thermal runaway.

Now, all of the cooling devices from the prior art, in particular that from Mersen, do not make it possible to actually mitigate thermal runaway of an accumulator battery within a battery pack, that is to say make it possible to attenuate the transmission of the energy dissipated by thermal runaway of the accumulator battery to the other accumulator batteries of the pack, in order to avoid these entering into a thermal runaway situation.

There is therefore a need to improve battery pack cooling solutions, in particular in order to absorb the energy dissipated by thermal runaway of a given accumulator battery within the pack and thus to limit the temperature of the other accumulator batteries of the pack, and hence to avoid these other accumulator batteries from also starting thermal runaway. Furthermore, the improvement should also be optimized in terms of weight and bulk in order to maintain the performance of the pack.

The aim of the invention is to at least partly meet this need/these needs.

DISCLOSURE OF THE INVENTION

To this end, according to one of its aspects, the invention relates to a busbar for a battery pack, intended to electrically connect at least one electrochemical accumulator battery of the pack, preferably to electrically connect several electrochemical accumulator batteries of the pack to one another, comprising an electrically conductive and sealtight envelope designed to contain a heat transfer liquid whose vaporization temperature is chosen so as to be between a value close to 90% of the self-heating temperature (T1) and a value close to 110% of the thermal runaway temperature (T2) of the accumulator batteries of the pack, the sealtight envelope being designed to guarantee an injection of heat transfer liquid close to each accumulator battery to which it is intended to be connected, preferably close to at least one of its output terminals.

With regard to the thermal runaway phenomenon, reference will be made to publication [1] and to the protocol described in this publication. The what are called "self-heating" and "thermal runaway" temperatures are respectively denoted T1 and T2 in this publication. The temperature T1, typically 70° C., in FIG. 2 of the publication, is the temperature starting from which the accumulator battery heats up without an external source at a typical rate of 0.02° C./min in adiabatic conditions.

The temperature T2, typically 150° C., in FIG. 2 of the publication, is the temperature starting from which the accumulator battery heats up at a typical heating rate of 10° C./min in adiabatic conditions, thereby leading to melting of the separator in the electrochemical assembly of the accumulator battery, to a short circuit and therefore to a collapse in the voltage.

"Thermal runaway" may thus be understood to mean, here and in the context of the invention, a ratio between the value of the derivative of the heating temperature and that of time, at least equal to 0.02° C. per min.

According to a first embodiment, the envelope is a sealtight finite volume containing the heat transfer liquid, intended to be arranged at least partly close to each accumulator battery to which it is connected, preferably close to at least one of the output terminals of each accumulator battery.

According to a second embodiment, the envelope is part of a flow circuit for the heat transfer liquid, intended to be arranged at least partly close to each accumulator battery to which it is connected, preferably close to at least one of the output terminals of each accumulator battery. According to this second embodiment, the liquid is able either to flow when the pump of the cooling system is working, or to remain static in the sealtight envelope when the pump has stopped.

For this first and second embodiment, as specified below, it is advantageous for the heat transfer liquid to be able to be distributed within the envelope through gravity, in particular in the event of boiling.

According to one advantageous mode of construction, the envelope is not a component that is attached to the busbar, but consists of two electrically conductive preferably metal sheets that are intended to channel the current from the accumulator batteries, and joined together in a sealtight manner, preferably by welding, in order to internally define a heat transfer liquid container intended to be arranged facing or around an end face of each accumulator battery.

Creating the sealtight envelope with an electrically conductive preferably metal sheet assembly is particularly advantageous. Due to the fact that, in comparison with a busbar from the prior art, the thickness thereof is essentially distributed over those of the two sheets, the busbar according to the invention is more flexible, thereby making it beneficial for integration within a battery pack.

The fact that the busbar is made from sheets also makes it possible to structure its surface as needed in order to improve the exchange with the heat transfer fluid.

Furthermore, a busbar according to the invention will be able to have a lower total thickness by virtue of its intrinsic cooling in the presence of the heat transfer liquid. Therefore, a busbar as such is not as good a conductor of heat, with regard to its metal envelope, as a solid busbar from the prior art. Its low thickness will facilitate the exchange of heat between the cell releasing the heat and the heat transfer fluid. Said fluid will then displace the stored heat beyond the adjacent accumulator batteries, thus limiting the heat propagated to the cells adjacent to the one emitting the heat. This also promotes improved protection against the propagation of thermal runaway.

According to a first variant embodiment, the container is defined by the entire sheet surface intended to face the accumulator batteries, except for the areas intended to face the spaces between accumulator batteries. Thus, according to this first variant, a sort of heat transfer liquid pocket is created, which will be located facing the total surface of the accumulator battery ends. It is specified here that the welds on the accumulator batteries in this variant are not formed through the two sheets at the same time in order to preserve the volume of the container.

According to a second variant embodiment, the container is defined by the entire sheet surface intended to face the accumulator batteries, except for the areas intended to face the end faces of the accumulator batteries. Thus, according to this second variant, a sort of heat transfer liquid pocket is created, which will be between the ends of the adjacent accumulator batteries.

Advantageously, the envelope comprises through-holes passing through the two joined sheets, outside of the areas of the liquid container, the through-holes being intended to evacuate gases emitted by at least one accumulator battery in thermal runaway.

Again advantageously, the through-holes are distributed in rings, each ring being intended to face an end face of an accumulator battery, preferably around an output terminal or safety blowhole through which gases are able to escape.

Again advantageously, the busbar may comprise an additional sheet, which is preferably electrically conductive and preferably joined to the sealtight envelope, this additional sheet being designed to recover the gases emitted through the holes, channel them and cool them with the heat transfer liquid.

According to one advantageous variant embodiment, one of the two sheets has a thickness less than that of the other of the two sheets, the sheet of lesser thickness being intended to be closer to the accumulator batteries to which it is intended to be connected. The thermal barrier to be crossed between the accumulator battery and the heat transfer liquid is thus able to be reduced. According to this variant, the flow cross section for the current is able to be provided by the outer sheet, which may be thickened for this purpose if necessary. According to this variant, the assembly welds between the two sheets are preferably remote from the areas intended to face the output terminals of the accumulator batteries. Thermal conduction between accumulator batteries is thus limited by seeking to promote the flow via the thin sheet and the heat transfer fluid, and not via the thicker sheet, i.e. the outer one. Another subject of the invention is a battery pack comprising at least one module comprising:
- a plurality of accumulator batteries with a prismatic geometry, each comprising at least one electrochemical cell C formed of a cathode, of an anode and of an electrolyte interposed between the cathode and the anode, and a housing designed to contain the electrochemical cell in a sealtight manner and two output terminals projecting from the cover and/or from the base of the housing;
- at least one busbar as described above, welded to one of the output terminals of at least some of the accumulator batteries, in order to electrically connect them to one another.

According to one embodiment, the pack comprises a fluid circuit configured so as to channel a possibly two-phase liquid-vapor heat transfer fluid in the busbar.

The circuit is preferably configured so as to passively allow, through gravity, a supply of the heat transfer liquid facing or around each accumulator battery. This makes it possible to maintain a good exchange coefficient during the phase change of the heat transfer fluid.

Advantageously, the busbar is inclined with respect to the horizontal when the pack is in an operational configuration. A busbar according to the invention is thus not arranged horizontally, and its incline with respect to the horizontal makes it possible to create a passive pump effect through natural convection: the gas resulting from the boiling of the heat transfer fluid (phase change) entrains the hot liquid to the upper part of the busbar, leaving space for liquid present elsewhere in the sealtight envelope, which is still cold. This makes it possible as far as possible to keep a good heat exchange between the envelope and the heat transfer liquid, the heat exchanges with a solely gaseous phase (without liquid in the fluid area) being far less effective. Holes or safety blowholes are provided for the passage of the gases resulting from the phase change of the heat transfer fluid, since the latter will increase the volume necessary for the encapsulation thereof in the sealtight envelope of the busbar.

In addition to or instead of these safety holes, it is also possible to contemplate having welds between the two sheets of the envelope that are mechanically weaker in the upper part in order to yield to the predefined excess pressure.

In a module or the whole of a battery pack, it is possible to contemplate installing and connecting a busbar according to the invention only on one end face of the accumulator batteries. It is also possible to contemplate installing and connecting a busbar according to the invention on either side of the accumulator batteries, that is to say on their two end faces.

The invention thus consists essentially of a busbar integrated into one or more modules of a battery pack containing heat transfer liquid that is able to change phase (liquid to vapor) in order to absorb the energy dissipated by a thermal runaway of a given accumulator battery within the pack.

The phase change of the liquid generally absorbs much more energy in comparison with a simple temperature increase.

Due to this, the energy of the thermal runaway of the first accumulator battery is not transmitted in its entirety to the adjacent accumulator batteries of the pack, thus limiting their temperature.

Therefore, a busbar according to the invention makes it possible to avoid accumulator batteries close to an accumulator battery in thermal runaway from themselves also starting thermal runaway.

In the context of the invention, the heat transfer liquid is advantageously dielectric, but may also be electrically conductive.

When the liquid is dielectric, then the fluid connection between the busbars of several modules is in single form, and only one liquid is able to flow in the entire battery pack, regardless of the voltage.

When the liquid is electrically conductive, then care is taken that the fluid connection between busbars of the modules does not create a short circuit between the various voltage levels.

A list of heat transfer liquids identified by the inventors suitable for implementing the invention is as follows: water, mixture of water and propylene glycol, and liquids having a boiling temperature between 70° C. and 150° C., a latent heat that is as high as possible and a flammability temperature that remains high enough so as not to pose a problem in the event of runaway of an accumulator battery.

Ultimately, the invention affords numerous advantages, including:

A/ during static operation, that is to say when the heat transfer liquid inside the sealtight envelope is not flowing:

absorbing most of the heat flow generated by an accumulator battery in thermal runaway within a pack, evacuating thermal energy as close as possible to the accumulator battery in thermal runaway, preferably at at least one terminal of the accumulator battery, this being all the more beneficial since the heat flow emitted by the accumulator battery is often greatest in this area;

passively distributing the heat transfer liquid through gravity during local boiling thereof; contribution of all of the fluid available to the evacuation of calories regardless of the faulty accumulator battery; maintaining a good heat exchange by maintaining the presence of the liquid and effectiveness of the cooling via vaporization.

no addition of additional metal mass in a battery pack in comparison with the prior art. Specifically, the two sheets for creating the sealtight envelope according to the invention may have a total thickness that is substantially the same as the single thickness of a traditional solid busbar.

B/ during dynamic operation, that is to say with a flow of liquid within the sealtight envelope:

using the heat transfer liquid to cool the battery pack in normal conditions (charging/discharging, rapid charging);

possibly electrically underdimensioning a busbar according to the invention due to it being cooled by the heat transfer liquid that it contains: the cross section of the busbar, and therefore its mass, is able to be reduced, and this may at least partly compensate the mass of cooling heat transfer liquid flowing in the battery pack;

monitoring the temperature of the heat transfer liquid in order to detect abnormal heating thereof caused by the onset of thermal runaway within a battery pack. It is then advantageously possible to contemplate applying a strategy for protecting the battery pack and maintaining service, such as for example electrically disconnect a module or a branch of the pack, or else trigger a fire extinguisher, etc.

For application to a Li-ion battery pack, each accumulator battery is a Li-ion accumulator battery in which:

the negative electrode(s) material is chosen from the group comprising graphite, lithium, lithium titanate oxide $Li_4TiO_5O_{12}$;

the positive electrode(s) material is chosen from the group comprising $LiFePO_4$, $LiCoO_2$, $LiNi_{0.33}Mn_{0.33}CO_{0.33}O_2$.

Other advantages and features of the invention will become more clearly apparent upon reading the detailed description of exemplary implementations of the invention, given by way of non-limiting illustration with reference to the following figures.

DETAILED DESCRIPTION

FIGS. 1 to 5 relate to different examples of Li-ion accumulator batteries, flexible packagings and accumulator battery housings and a battery pack according to the prior art. These FIGS. 1 to 5 have already been commented on in the preamble and are therefore not commented on any more below.

For the sake of clarity, the same references denoting the same elements according to the prior art and according to the invention are used for all of FIGS. 1 to 9.

Throughout the present application, the terms "lower", "upper", "bottom", "top", "below" and "above" should be understood with reference to Li-ion accumulator battery housings that are inclined with respect to the vertical, that is to say with a busbar according to the invention inclined with respect to the horizontal.

Figure 6:
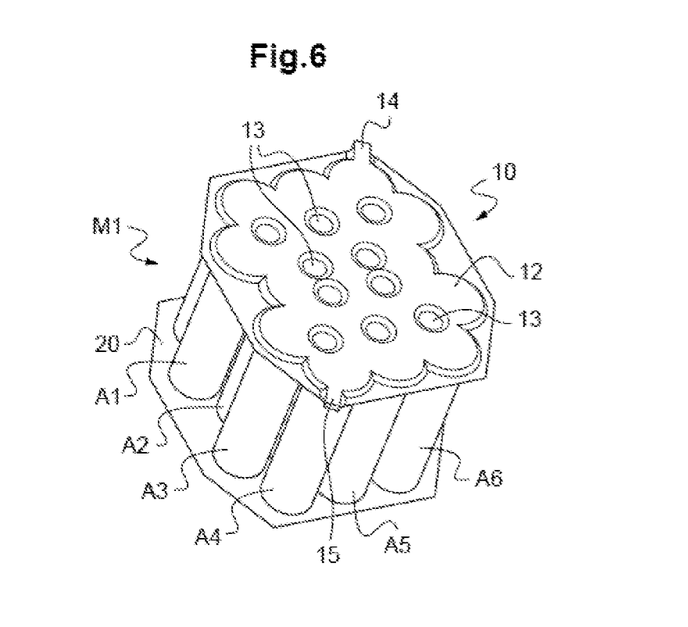
FIG. 6 is a perspective plan view of a battery pack module equipped with a busbar according to a first embodiment of the invention.
Figure 6A:
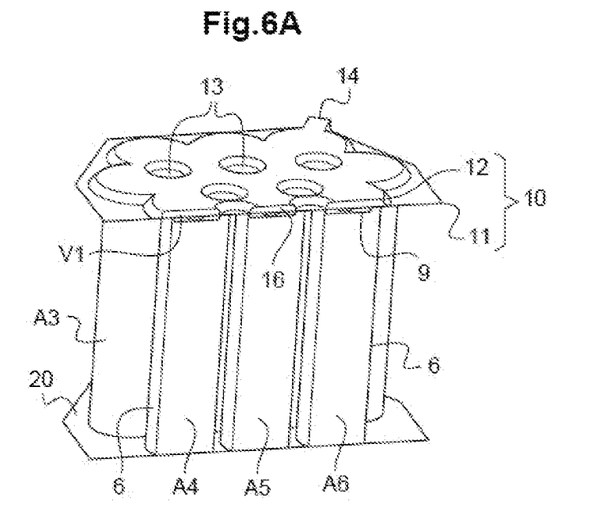
FIG. 6A is a perspective and longitudinal sectional view of a module according to FIG. 6.

FIGS. 6 and 6A show a first example of a busbar 10 according to the invention in a module M1 of a battery pack P of Li-ion accumulator batteries, A1, A2, . . . , A17. In the illustrated examples, the accumulator batteries A1-A17 that are illustrated have housings in a cylindrical format, typically the 18650 or 21700 format.

The accumulator batteries A1-A17 are supported by a support plate 20 and are connected electrically in parallel in groups by the busbar 10.

The busbar 10 according to the invention is a sealtight envelope arranged above the cover 9 of the Li-ion accumulator batteries A1-A17. It is specified here that the term "above" should be considered here with the Li-ion accumulator batteries in the vertical position, and therefore with the busbar 10 arranged horizontally above, this not being the operational configuration of the modules M1, M2, in which the busbar 10 is inclined with respect to the horizontal.

The sealtight envelope of the busbar 10 consists of two metal sheets 11, 12 joined to one another in a sealtight manner, by a weld S2, S3, in order to internally define a heat transfer liquid container V1 intended to be arranged facing the covers 9 of all of the accumulator batteries, from where their positive 4 or negative 5 output terminals project. The sheet 11 closer to the accumulator batteries has a lesser thickness than the outer sheet 12.

The sheet 11 is fastened by a weld S1 to each negative output terminal 5 of the accumulator batteries.

In this module M1, the busbar 10 therefore has a container V1 that forms a heat transfer liquid pocket, which is defined by the entire surface of the sheet 11 and the sheet 12 facing the accumulator batteries, except for the areas 13 facing the spaces between the accumulator batteries.

This container V1 may be closed and therefore be a finite volume.

An inlet 14 and an outlet 15 may also be provided at the ends of the volume V1 in order to allow heat transfer liquid to flow therein. Located at the upper part of the pack, the inlet 14 or outlet 15 may also be used to evacuate the vaporized gas from the heat transfer fluid. This flow of heat transfer liquid within the volume V1 is integrated into the heat transfer liquid circuit of the battery pack that incorporates the module M1, which will therefore make it possible to cool the plurality of accumulator batteries A1-A17 through the flow of heat transfer liquid within busbars 10 according to the invention.

Figure 7:
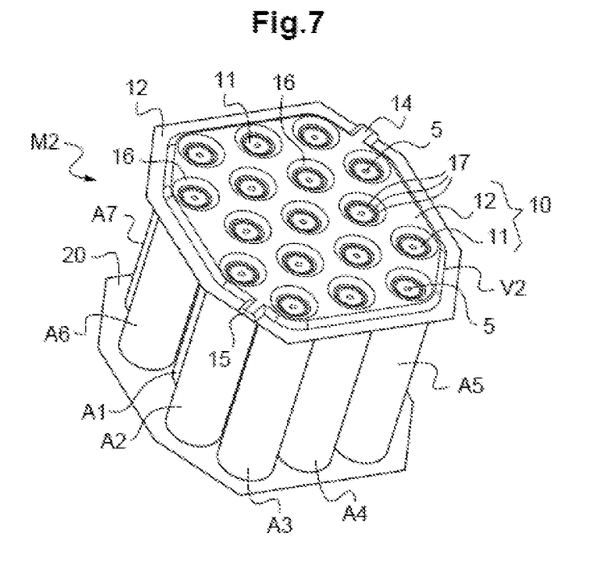
FIG. 7 is a perspective plan view of a battery pack module equipped with a busbar according to a second embodiment of the invention.
Figure 7A:
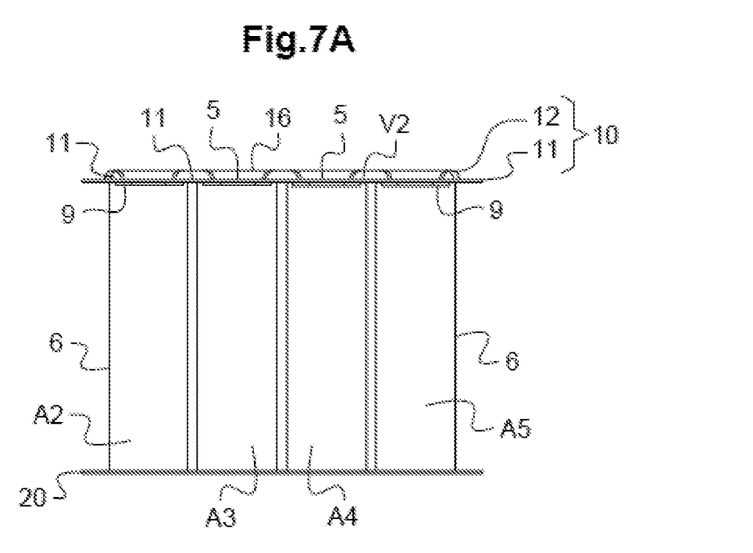
FIG. 7A is a perspective and longitudinal sectional view of a module according to FIG. 7.
Figure 7B:
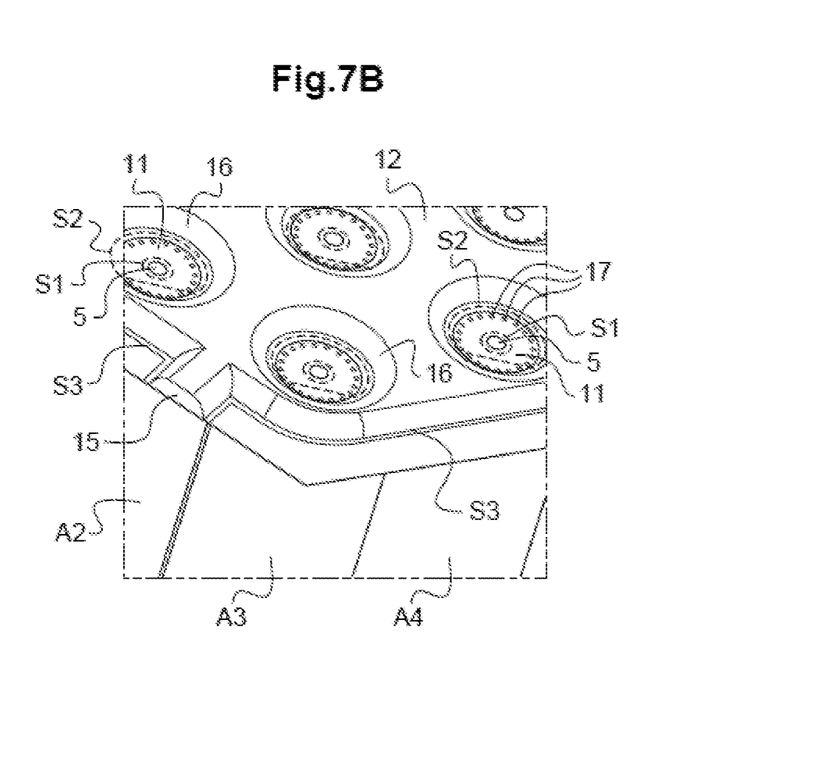
FIG. 7B is a detailed view of FIG. 7A.
Figures 7C, 8:
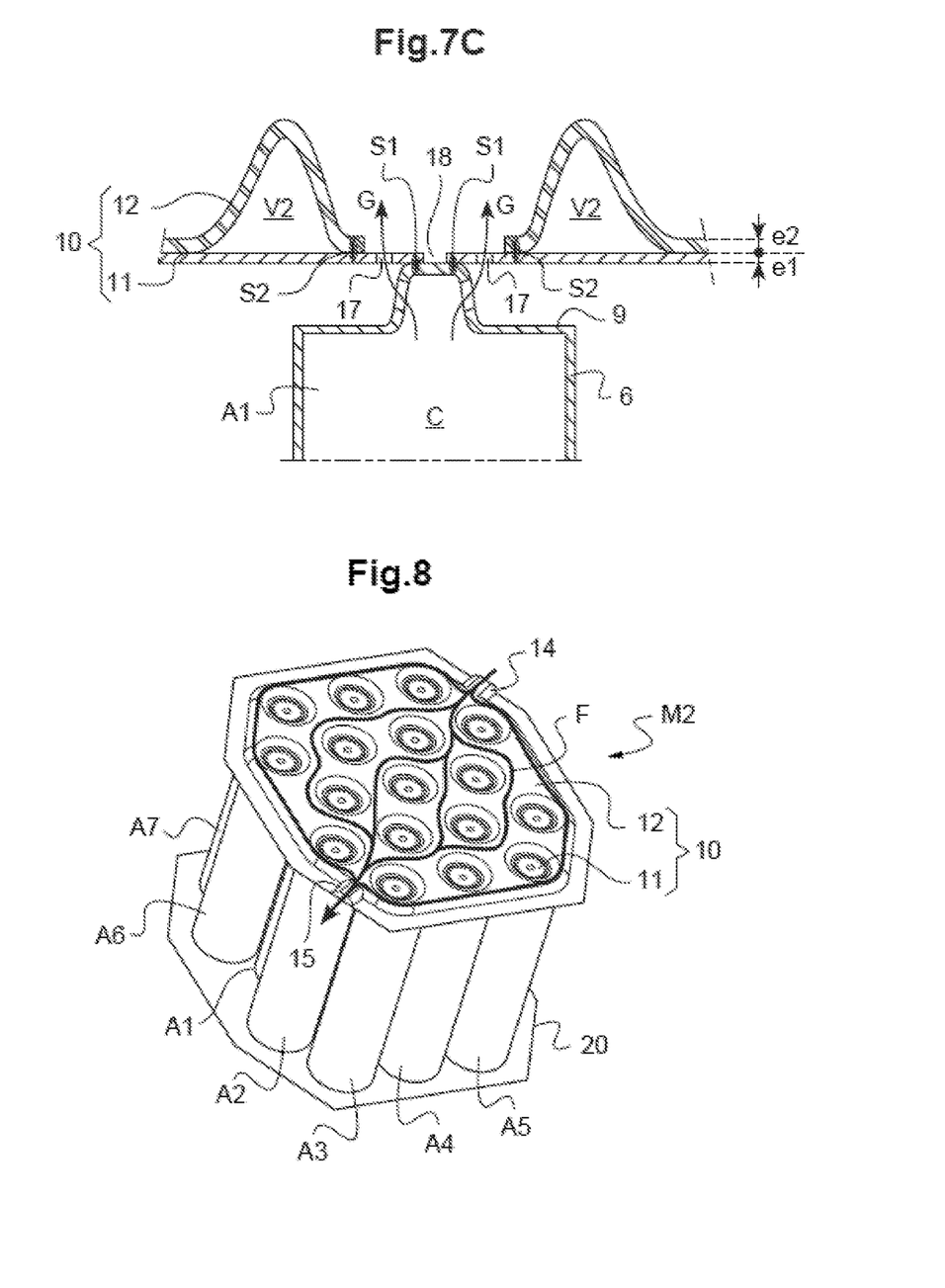
FIG. 7C is a schematic longitudinal sectional view of a module similar to that of FIG. 7 in an accumulator battery.
FIG. 8 picks up from FIG. 7 and illustrates a flow of the heat transfer liquid within the busbar according to the second embodiment.

FIGS. 7 to 7C show a second example of a busbar 10 according to the invention in a module M2 of a battery pack P of Li-ion accumulator batteries, A1, A2, . . . , A17.

The accumulator batteries A1-A17 are also supported by a support plate 20 and are connected electrically in parallel in groups by the busbar 10.

The sealtight envelope of the busbar 10 also consists here of two metal sheets 11, 12 joined to one another in a sealtight manner, by a weld S2, S3, in order to internally define a heat transfer liquid container V2 intended to be arranged facing the covers 9 of all of the accumulator batteries, from where their positive 4 or negative 5 output terminals project. The sheet 11 closer to the accumulator batteries has a lesser thickness than the outer sheet 12. By way of example, the thickness e1 of the sheet 11 may be between 0.05 and 0.5 mm, typically equal to 0.1 mm, whereas that e2 of the sheet 12 may be between 0.1 and 2 mm, typically equal to 0.3 mm.

With a sheet 11 of lesser thickness, the thermal barrier to be crossed between each accumulator battery and the heat transfer liquid in the container V2 is smaller. The flow cross section for the current is able to be provided by the thicker outer sheet 12, by spacing the terminals and the contact points between plates.

The sheet 11 is also fastened by a weld S1 to each positive 4 or negative 5 output terminal of the accumulator batteries.

The structural difference between the module M2 according to FIGS. 7 to 7C and that M1 of FIGS. 6, 6A is that, in this module M2, the busbar 10 has a container V2 that forms a heat transfer liquid pocket, which is defined by the entire surface of the sheet 11 facing the accumulator batteries, except for the areas 16 facing the end faces 9 of the accumulator batteries.

Thus, as is able to be seen better in FIGS. 7B and 7C, in the areas 16, the sheet 11 to which the positive 4 or negative 5 output terminals are welded by the welds Si is exposed and in contact with the surroundings above the module M2.

The sheet 11 furthermore comprises through-holes 17 outside of the areas of the liquid container V2. These through-holes 17 make it possible to evacuate the gases emitted by at least one accumulator battery in thermal runaway.

Preferably, as shown in FIGS. 7 to 7B, the through-holes 17 are distributed in rings, each ring facing an end face 9 of an accumulator battery, around an output terminal via which the gases are able to escape.

The assembly welds S2, S3 between the two sheets 11, 12 are remote from the areas 16 facing the output terminals of the accumulator batteries. This makes it possible to limit thermal conduction between accumulator batteries via the thicker sheet 12, i.e. the outer one.

In order to allow optimized centering when positioning the busbar 10 with respect to each accumulator battery, it is possible to provide holes 18 that will each face an output terminal before the welds S1 are formed.

The container V2 may also be closed and therefore be a finite volume.

It is also possible to provide an inlet 14 and an outlet 15 at the ends of the volume V2 in order to allow heat transfer liquid to flow therein from the heat transfer liquid circuit of the battery pack, or even blowholes for evacuating the gas resulting from the vaporization of the heat transfer fluid.

FIG. 8 illustrates the flow of dielectric heat transfer fluid F homogeneously everywhere facing the surfaces between the accumulator batteries A1-A17, as close as possible to the positive 4 or negative 5 output terminals.

Figure 9:
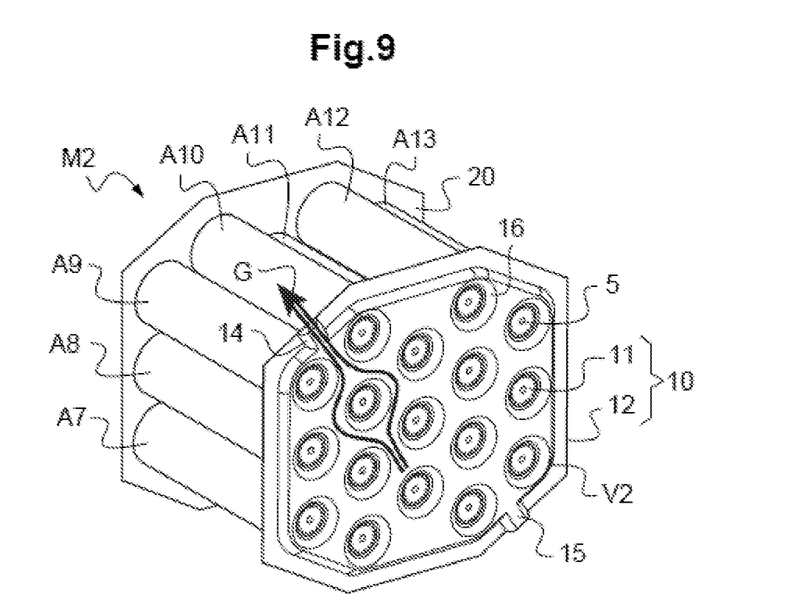
FIG. 9 is a perspective view of a module according to FIG. 7, in an operational configuration with the busbar vertical, FIG. 9 showing the evacuation of the gases emitted when the heat transfer liquid is vaporized.

FIG. 9 shows an operational configuration in which the busbar of the module M2 is vertical and, in the form of an arrow, the evacuation of the gases G emitted during the vaporization of the heat transfer liquid caused by the thermal runaway of an accumulator battery within the module.

The invention is not limited to the examples that have just been described; it is in particular possible to combine features of the examples illustrated within variants that are not illustrated.

Other variants and improvements may be contemplated without otherwise departing from the scope of the invention.

For example, although the busbar that has just been described comprises a sealtight envelope formed by joining exactly two sheets 11, 12 to one another, it is possible to provide a three-sheet assembly with an additional sheet.

This additional sheet would have the role of recovering the gases emitted through the holes 17, channeling them in order to limit the impact of their toxicity and cooling them with the heat transfer fluid. This third sheet may in this case be thicker than the other two sheets 11, 12.

Other holes or safety blowholes may be provided for the passage of the gases resulting from the phase change of the heat transfer fluid, since the latter will increase the volume necessary for the encapsulation thereof in the sealtight envelope of the busbar. These holes or blowholes in the upper part may be situated for example at the end of an inlet 14 or outlet 15 (FIGS. 6 to 9).

LIST OF CITED REFERENCES

[1] Xuning Fenga, et al. "*Key Characteristics for Thermal Runaway of Li-ion Batteries*" Energy Procedia, 158 (2019) 4684-4689

The invention claimed is:

1. A busbar for a battery pack, intended to electrically connect at least one electrochemical accumulator battery of the pack, the at least one accumulator battery having a self-heating temperature and a thermal runaway temperature, wherein the busbar comprises an electrically conductive and sealtight envelope intended to conduct a current of the accumulator batteries and configured to contain a heat transfer liquid having a vaporization temperature chosen so as to be comprised between a value close to 90% of the self-heating temperature and a value close to 110% of the thermal runaway temperature of the accumulator batteries of the pack, the sealtight envelope being configured to guarantee an injection of heat transfer liquid as close as possible to each accumulator battery to which the sealtight envelope is intended to be connected.

2. The busbar as claimed in claim 1, wherein the envelope is a sealtight finite volume containing the heat transfer liquid, configured to be arranged at least partly as close as possible to each accumulator battery to which the sealtight finite volume is intended to be connected.

3. The busbar as claimed in claim 1, wherein the sealtight envelope is part of a flow circuit for the heat transfer liquid, configured to be arranged at least partly as close as possible to each accumulator battery to which the sealtight envelope is intended to be connected.

4. The busbar as claimed in claim 1, wherein the sealtight envelope consists of two electrically conductive sheets that are joined together in a sealtight manner in order to internally define a heat transfer liquid container intended to be arranged facing or around an end face of each accumulator battery.

5. The busbar as claimed in claim 4, wherein the container is defined by the entire sheet surface intended to face the accumulator batteries, except for the areas intended to face spaces between accumulator batteries.

6. The busbar as claimed in claim 4, wherein the container is defined by the entire sheet surface intended to face the accumulator batteries, except for the areas intended to face end faces of the accumulator batteries.

7. The busbar as claimed in claim 4, wherein the envelope comprises through-holes passing through the two joined sheets outside of the liquid container, the through-holes being intended to evacuate gases emitted by at least one accumulator battery in thermal runaway.

8. The busbar as claimed in claim 7, wherein the through-holes are distributed in rings, each ring being intended to face an end face of an accumulator battery.

9. The busbar as claimed in claim 7, wherein the busbar comprises an additional sheet, said additional sheet being configured to recover the gases emitted through the holes, to channel said gases and to cool said gases with the heat transfer liquid.

10. The busbar as claimed in claim 4, wherein one of the two sheets has a thickness less than a thickness of the other of the two sheets, the sheet of lesser thickness being intended to be closer to the accumulator batteries to which the sealtight envelope is intended to be connected than the sheet of greater thickness.

11. The busbar as claimed in claim 9, wherein assembly welds between the two sheets are remote from areas intended to face output terminals of the accumulator batteries.

12. A battery pack comprising at least one module comprising:
   a plurality of accumulator batteries with a cylindrical geometry, each comprising at least one electrochemical cell formed of a cathode, of an anode and of an electrolyte interposed between the cathode and the anode, a housing designed to contain the electrochemical cell in a sealtight manner and two output terminals projecting from a cover and/or from a base of the housing;
   at least one busbar as claimed in claim 1, welded to one of the output terminals of at least some of the accumulator batteries, in order to electrically connect the accumulator batteries to one another.

13. The battery pack as claimed in claim 12, wherein the pack comprises a fluid circuit configured so as to channel a heat transfer fluid in the busbar.

14. The battery pack as claimed in claim 13, wherein the circuit is configured so as to passively allow, through gravity, a supply of the heat transfer liquid facing or around each accumulator battery.

15. The battery pack as claimed in claim 12, wherein the busbar is inclined with respect to an horizontal plane when the pack is in an operational configuration, so as to allow evacuation of gases resulting from vaporization of the heat transfer liquid through a top side of the pack.

16. The battery pack as claimed in claim 12, each accumulator battery being a Li-ion accumulator battery, wherein:
   the negative electrode(s) material is chosen from the group comprising graphite, lithium, lithium titanate oxide $Li_4TiO_5O_{12}$;
   the positive electrode(s) material is chosen from the group comprising $LiFePO_4$, $LiCoO_2$, $LiNi_{0.33}Mn_{0.33}Co_{0.33}O_2$.

17. The busbar as claimed in claim 1, wherein each accumulator battery has two output terminals and the sealtight envelope is designed to guarantee an injection of heat transfer liquid close to at least one of the output terminals of each accumulator battery to which the sealtight envelope is intended to be connected.

18. The battery pack as claimed in claim 13, wherein the heat transfer fluid is a two-phase liquid-vapor heat transfer fluid.

\* \* \* \* \*